(12) United States Patent
Wilson et al.

(10) Patent No.: US 8,030,873 B2
(45) Date of Patent: Oct. 4, 2011

(54) WALK AND ROLL ROBOT

(75) Inventors: Andrew Wilson, Allison Park, PA (US); Andrew Punnoose, Ashburn, VA (US); Katherine Strausser, Houston, TX (US); Neil Parikh, North Brunswick, NJ (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 596 days.

(21) Appl. No.: 12/187,926

(22) Filed: Aug. 7, 2008

(65) Prior Publication Data

US 2009/0039819 A1    Feb. 12, 2009

Related U.S. Application Data

(60) Provisional application No. 60/954,908, filed on Aug. 9, 2007, provisional application No. 61/086,627, filed on Aug. 6, 2008.

(51) Int. Cl.
*B25J 5/00* (2006.01)
(52) U.S. Cl. .................... 318/568.12; 318/568.2
(58) Field of Classification Search ............. 318/568.12, 318/567, 568.2, 560
See application file for complete search history.

*Primary Examiner* — Rina Duda
(74) *Attorney, Agent, or Firm* — Heather Goo (57) ABSTRACT

A mobile robotic unit features a main body, a plurality of legs for supporting the main body on and moving the main body in forward and reverse directions about a base surface, and a drive assembly. According to an exemplary embodiment each leg includes a respective pivotal hip joint, a pivotal knee joint, and a wheeled foot adapted to roll along the base surface. Also according to an exemplary embodiments the drive assembly includes a motor operatively associated with the hip and knee joints and the wheeled foot for independently driving pivotal movement of the hip joint and the knee joint and rolling motion of the wheeled foot. The hip joint may include a ball-and-socket-type joint interconnecting top portion of the leg to the main body, such that the hip joint is adapted to pivot said leg in a direction transverse to a forward-and-reverse direction.

20 Claims, 8 Drawing Sheets

WALK AND ROLL ROBOT

CROSS-REFERENCE TO RELATED APPLICATION(S)

This application is based upon prior filed provisional patent applications Ser. Nos. 61/086,627 filed Aug. 6, 2008, and 60/954,908 filed Aug. 9, 2007, the entire subject matters of which are incorporated herein by reference.

ORIGIN OF THE INVENTION

The invention described herein was made by an employee under contract with the United States Government and may be manufactured and used by or for the Government for Government purposes without the payment of any royalties thereon or therefore.

FIELD OF THE INVENTION

The invention provides a walk and roll robot with increased robustness, increased energy efficiency, and reduced weight.

DESCRIPTION OF RELATED ART

Rolling is the most efficient gait for traversal of many terrains. However, in scenarios when the robot cannot roll over or around an object, it is important that the robot possess the capability to walk or step over the object in order to proceed on its path. Because many existing mobile robots lack the ability to both roll and walk, state of the art robots have limited mobility.

Existing robots that possess multiple degrees of freedom of movement typically utilize one motor for each degree of freedom. The weight and size penalties and power demands of such multiple motor robots may become excessive, making the robot inappropriate or less than desirable for certain practical applications. Other robots that permit for multiple degrees of freedom of movement are incapable of articulating their multiple degrees of freedom simultaneously, thereby creating cumbersome and awkward joint movements. Still other robots are limited in their ability to move both forward and backward, and/or to react or absorb impact without damage.

Previous rover designs exist, for example, the Jet Propulsion Lab (JPL) ATHLETE and Spirit and Opportunity Rovers. ATHLETE was designed by JPL for the purpose of carrying large payloads and docking with other ATHLETE robots for the purpose of increasing overall carrying capacity. The robot uses a motor to actuate each joint and has 6 degrees of freedom on each of its six legs. The Spirit and Opportunity Rovers use a "Rocker-Bogie" system of movement by which they are able to traverse small obstacles but avoid objects they cannot drive over. (See U.S. Pat. Nos. 6,267,196; 6,112,843 the entire contents of which are hereby incorporated herein by reference).

The disadvantages of JPL's ATHLETE include that the robot uses a motor at each of the joints on its six legs, for a total of more than thirty motors, leading to high power constumption. In addition, ATHLETE was designed to be a teleoperated robot as a result of its complexity and therefore requires many human operators. The Spirit and Opportunity Rovers do not have the ability to both walk and roll and therefore move rather slowly and must avoid obstacles rather than traverse them. The Rovers only have the ability to traverse an obstacle twice the diameter of its wheels, leaving them unable to crawl over larger rocks, or change its center of mass where it may be useful. The Rovers are not a practical design for environments other than Mars in that they cannot achieve tasks such as jumping or crab walking. They also do not have a fully enclosed housing, leaving them vulnerable to dust particles, which are considered significantly problematic and corrosive. Similar problems exist with the Mars Athena Rover (See U.S. Pat. Nos. D487,715 and D488,093).

The need therefore exists for a walk and roll robot designed to increase robustness, reduced weight, and increase overall energy efficiency when compared with prior robot designs.

SUMMARY OF THE INVENTION

A first aspect of the invention provides a mobile robotic unit featuring a main body, a plurality of legs for supporting the main body on and moving the main body in forward and reverse directions about a base surface, and a drive assembly. Each leg includes a respective pivotal hip joint, a pivotal knee joint, and a wheeled foot adapted to roll along the base surface. The drive assembly comprises a motor operatively associated with the hip and knee joints and the wheeled foot for independently driving pivotal movement of the hip joint and the knee joint and rolling motion of the wheeled foot.

According to a second aspect of the invention, a mobile robotic unit features a main body, a plurality of legs for supporting the main body on and moving the main body in forward and reverse directions about a base surface, and a drive assembly.

A third aspect of the invention provides a mobile robotic unit featuring a main body, a plurality of legs for supporting the main body on and moving the main body in forward and reverse directions about a base surface, a swivel assembly engaging the plurality of swivel shafts and secured to the main body, and a drive assembly. Each leg includes a respective pivotal hip joint, a pivotal knee joint, and a wheeled foot adapted to roll along the base surface. The drive assembly comprises a motor, a plurality of drive shafts, and a plurality of swivel shafts adapted to cooperate with the swivel assembly. The motor is operatively associated with the drive shafts for independently driving pivotal movement of the hip joint and the knee joint with first and second degrees of freedom and rolling motion of the wheeled foot with a third degree of freedom. The motor also is operatively associated with the swivel shafts to pivot the leg with fourth and fifth degrees of freedom to permit swiveling movement of the leg.

In certain embodiments of the invention, the legs are adapted to travel in a walk and roll manner to allow for motions such as side-stepping or bracing against external forces, and to allow for the traversal of obstacles.

Other aspects of the invention, including devices, apparatus and methods, will become more apparent from the following detailed description and accompanying drawings.

BRIEF DESCRIPTION OF THE DRAWINGS

The accompanying drawings are incorporated in and constitute a part of the specification. In such drawings.

DETAILED DESCRIPTION OF EXEMPLARY EMBODIMENTS

Figure 1:
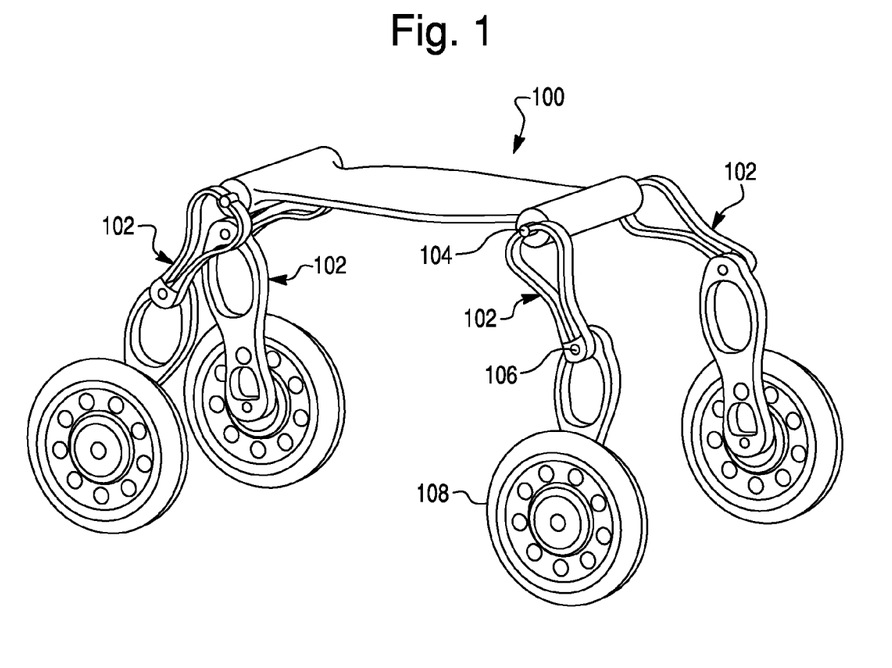
FIG. 1 illustrates a perspective view of a concept vehicle embodying some of the features of the present invention.
Figure 2:
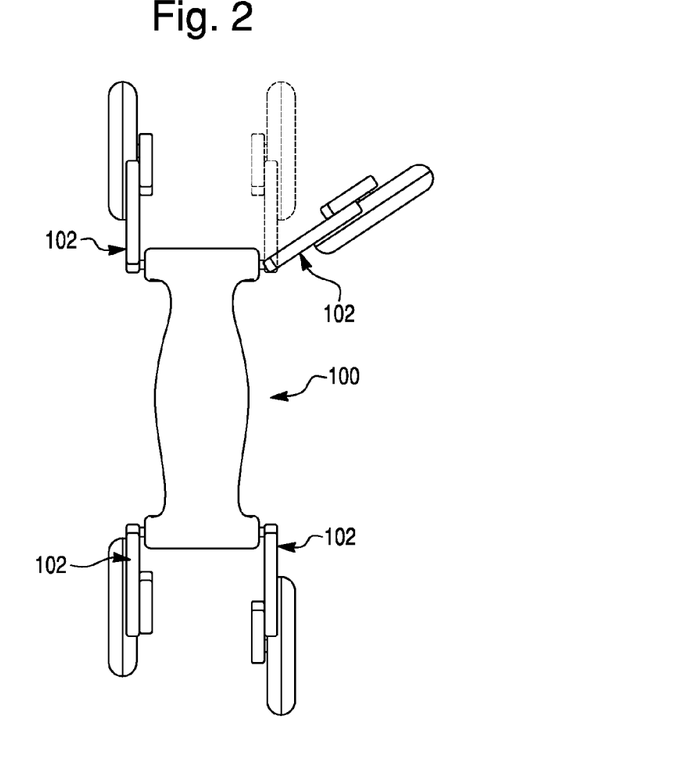
FIG. 2 illustrates an overhead view of the concept vehicle of FIG. 1 with the forward wheeled leg turning more than 45 degrees in a rightward direction.
Figure 3:
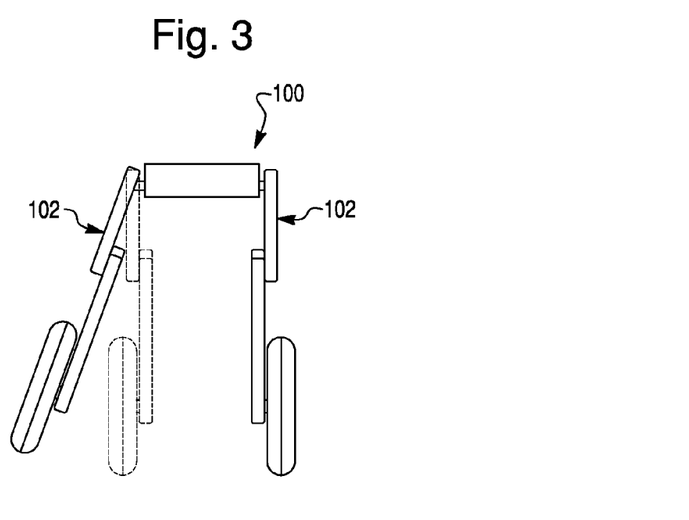
FIG. 3 illustrates a front view of the concept vehicle of FIG. 1 with the forward wheeled leg pivoting or splayed upward in a transverse direction to the forward travel direction of the vehicle.

According to a first exemplary embodiment of the invention, a walk-and-roll mobile robotic unit, also referred to herein as a robot or vehicle and generally designated by reference numeral 100 in FIGS. 1-3, is a quadruped, or four-legged robot. Each of the legs, generally designated by reference numeral 102, is capable of articulated walking motion and wheel rolling motion. The articulated walking motion and wheel rolling motion may be implemented separately or simultaneously, as will be described in further detail below.

The legs 102 are operatively connected to a main body 101 at a joint assembly described below. For simplification of the drawings and description, the main body 101 has been shown as a relatively planar plate having hollow cylindrical housings at its opposite ends for receiving the joint assemblies. Of course, the specific shape and configuration of the vehicle body 101 and the number of legs or other limbs of robotic unit 100 may be changed and adapted to meet the specific needs of the intended application and environment chosen for the walk and roll vehicle 100.

The legs 102 are hinged at joints 104 and 106 (FIG. 1) to simulate hip joint and knee joint movement, respectively. The legs 102 each further include a respective wheeled foot 108 provided to accomplish rolling motion for traversing the unit 100 across the ground. The combined walking and rolling motion of each leg 102 is managed by a drive system as described below.

In the first illustrated embodiment, each leg 102 is connected to the main body 101 of robotic unit 100 using a ball-and-socket joint assembly. The architecture of the ball-and-socket joint assembly will now be described generally. The joint assembly features a drive assembly and a swivel mechanism (also referred to herein as a swivel assembly or structure). Generally, the drive assembly comprises a motor I operatively engaged with a first plurality of swivel shafts 2, 3, and a second plurality of drive shafts 4, 5, 6. The drive shafts 4-6 and motor 1 are responsible for creating walking movement at joints 104 and 106 and rotation of wheels 108 for advancing or retreating the robot 100 across the ground or other surface. The swivel mechanism is operatively engaged with the second plurality of swivel shafts 2, 3 to allow the drive assembly to pivot with at least two degrees of freedom, in particular for controlling rotation about the anteroposterior and proximodistal axes (pivotal and splaying movement, respectively; see FIGS. 2 and 3) proximal to joint 104.

Figure 4:
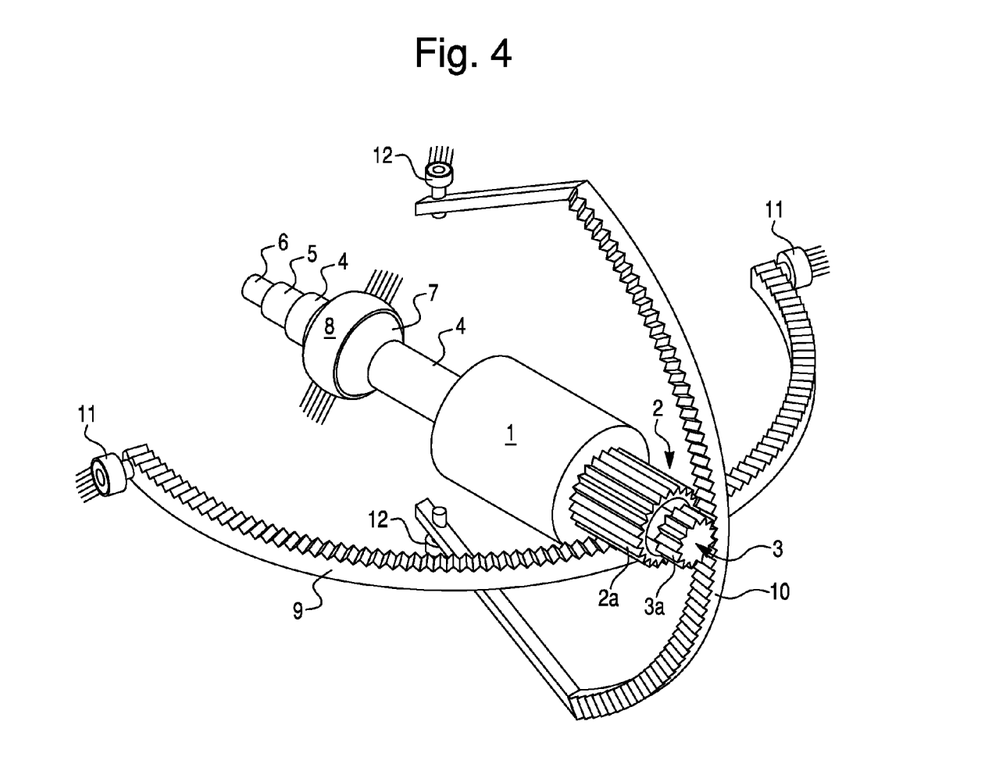
FIG. 4 illustrates a perspective view of the actuatable ball-and-socket joint architecture utilized by a joint of the concept vehicle according to an embodiment of the present invention.

Referring now to FIG. 4 in greater detail, the embodied ball-and-socket joint is designed around a motor 1. The motor 1 may comprise a directed flux motor. As best shown in FIG. 4, the motor 1 is central to the joint and moves with the movement of the entire drive assembly. The two rotatable swivel shafts 2, 3 of the drive assembly can be seen extending from one side of the motor 1. For the purposes of this disclosure, the side from which swivel shafts 2, 3 extend is designated the rear or posterior side of motor 1. Swivel shafts 2, 3 are concentrically arranged relative to one another, with swivel shaft 3 being disposed interiorly relative to swivel shaft 2. The swivel shafts 2, 3 each possess a pinion or gear 2a, 3a at their respective rear ends. It should be understood that the drive assembly may include additional swivel shafts. The motor 1 is designed to control rotation of shafts 2, 3 independently of one another, e.g., one of shafts 2, 3, may be rotated while the other shaft is not rotated. The motor 1 may also rotate shafts 2, 3 simultaneously at the same or different speeds.

The rotatable drive shafts 4-6 of the drive assembly extend from the opposite side of the motor 1, which is designated herein as the front or anterior side, toward legs 102. Drive shafts 4-6 are concentrically arranged relative to one another, with drive shaft 6 being the innermost of the drive shafts, and drive shaft 4 the outermost of the drive shafts. Drive shafts 4-6 may be coaxially aligned with swivel shafts 2, 3, as illustrated. The concentric and coaxial arrangement of the shafts 2-6 provides a compact arrangement with enhanced durability while, at the same time, reducing the chance of debris entering the motor 1.

The drive shafts 4-6 each possess a pinion or gear 4a, 5a, 6a, respectively, at their ends. It should be understood that the drive assembly may include fewer or additional drive shafts. Any number of shafts can cooperate with the motor 1 depending on the configuration of the motor assembly itself. The motor 1 is designed to control rotation of drive shafts 4-6 independently of one another and independently of swivel shafts 2, 3. Hence, any one, all, or less than all of shafts 2-6 may be rotated alone or in combination at any time at the same or different speeds.

The shafts 4-6 run concentrically through the small ball-and-socket assembly. The outermost drive shaft 4 forms a ball member 7 of the ball-and-socket assembly. A fixed bearing ring 8 circumscribes the ball member 7 as part of the socket of the ball-and-socket assembly. The ball-and-bearing ring assembly 7, 8 provides minimal friction for allowing ball member 7 to rotate freely in bearing ring 8 (as the motor 1 actuates the swivel shafts 2, 3 to move along rack members 9, 10, as will be described below). The bearing socket 8 maintains the stability of the drive assembly while the drive shafts 4, 5, 6 operate the legs 102 engaged thereto.

The swivel mechanism of FIG. 4 includes at least two rack members 9, 10. The rack members 9, 10 are formed as semi-circular arcs disposed such that the center of curvature of each rack member 9, 10 is at the pivot point 'p' of the ball-and-socket joint assembly. The swivel shafts 2, 3 mesh with a rack 9 on the horizontal axis and a rack 10 on the vertical axis, respectively. The swivel mechanism also includes fixed elements in the form of pins 11, 12 or similar connectors (e.g., fasteners, hooks, etc.) situated at the opposite ends of rack members 9, 10, respectively. The pins 11, 12 secure (e.g., fix, ground, or otherwise associate) racks 9, 10 to the robot main body 101. Rack 9 is pivotal about fixed pins 11 as the pinion 3a travels vertically along rack 10. The rack 10 is pivotal about fixed pins 12 as the pinion 2a travels horizontally along rack 9. Although not shown in FIG. 4, the pinions 2a, 3a are maintained in constant contact with rack members 9, 10 by suitable means such as a mechanical track and optionally a slidable holder that maintains the pinions 2a, 3a in fixed position relative to the rack members 9, 10 while permitting the pinions 2a, 3a to "walk" or travel along the rack members 9, 10.

The rack-and-pinion systems allow for movement in the anteroposterior and proximodistal axes (see FIGS. 2 and 3, respectively). In operation, when motor 1 rotates the swivel shafts 2 and/or 3, the rotating pinion or pinions 2a and/or 3a will travel along the rack(s) 9 and/or 10 in a known manner, e.g., using intermeshing teeth. Rotation of the pinions 2a, 3a and their interaction with racks 9, 10 induces a pivoting motion to the entire drive assembly, that is, the motor 1 and the shafts 4, 5, 6 as well as shafts 2, 3. In the illustrated embodiment, the drive shafts 4, 5, 6 and the swivel shafts 2, 3 pivot about a common pivot point 'p' that coincides with the center of the ball member 7 formed as part of the outer shaft 4. As mentioned above, the center of curvature of each rack member 9, 10 is preferably at the pivot point 'p'. (FIG. 5, which does not show the center of ball member 7 coinciding with the center of rack members 9, 10, is not drawn to scale.)

Because the swivel shafts 2, 3, can be driven independently of one another by motor 1, the joint assembly allows for swiveling movement with two degrees of freedom. The range of freedom of the joint is limited by the size of the ball-and-socket components and the length and dimensions of the two rack assemblies.

The following description will include various applications of walk-and-roll motion and the intelligent computer controlled techniques and technology required to perform the motions described herein. Cost and weight/size saving methods will also be described.

The ball and socket joint allows the three concentric shafts 4, 5, 6 to pass through the hip joint 7, 8 and maintain the ability to rotate freely. As described above, the outer hip drive shaft 4 bulges to a ball member 7 at the point it passes through bearing 8 at the side of the main body 101. The knee drive shaft 5 and wheel drive shaft 6 pass through the center of the hip drive shaft 4 concentrically, thus conveying the rotational motion provided by the motor 1 outside of the robot body 101 for controlling auxiliary elements, in particular the knee and wheel.

Figure 5:
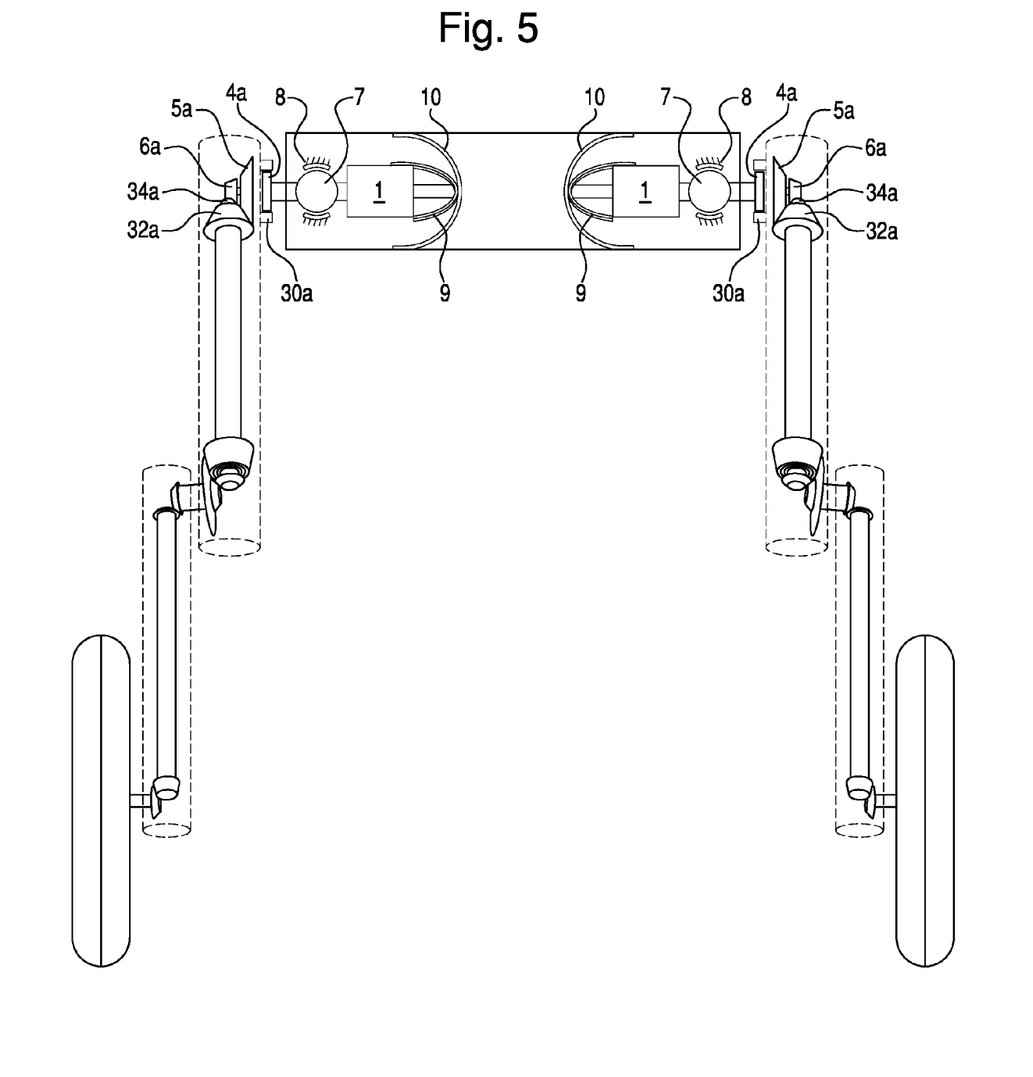
FIG. 5 illustrates a transparent view of an embodiment of the vehicle embodying a shaft drive system for the hip joint, knee joint and wheeled foot.
Figure 6:
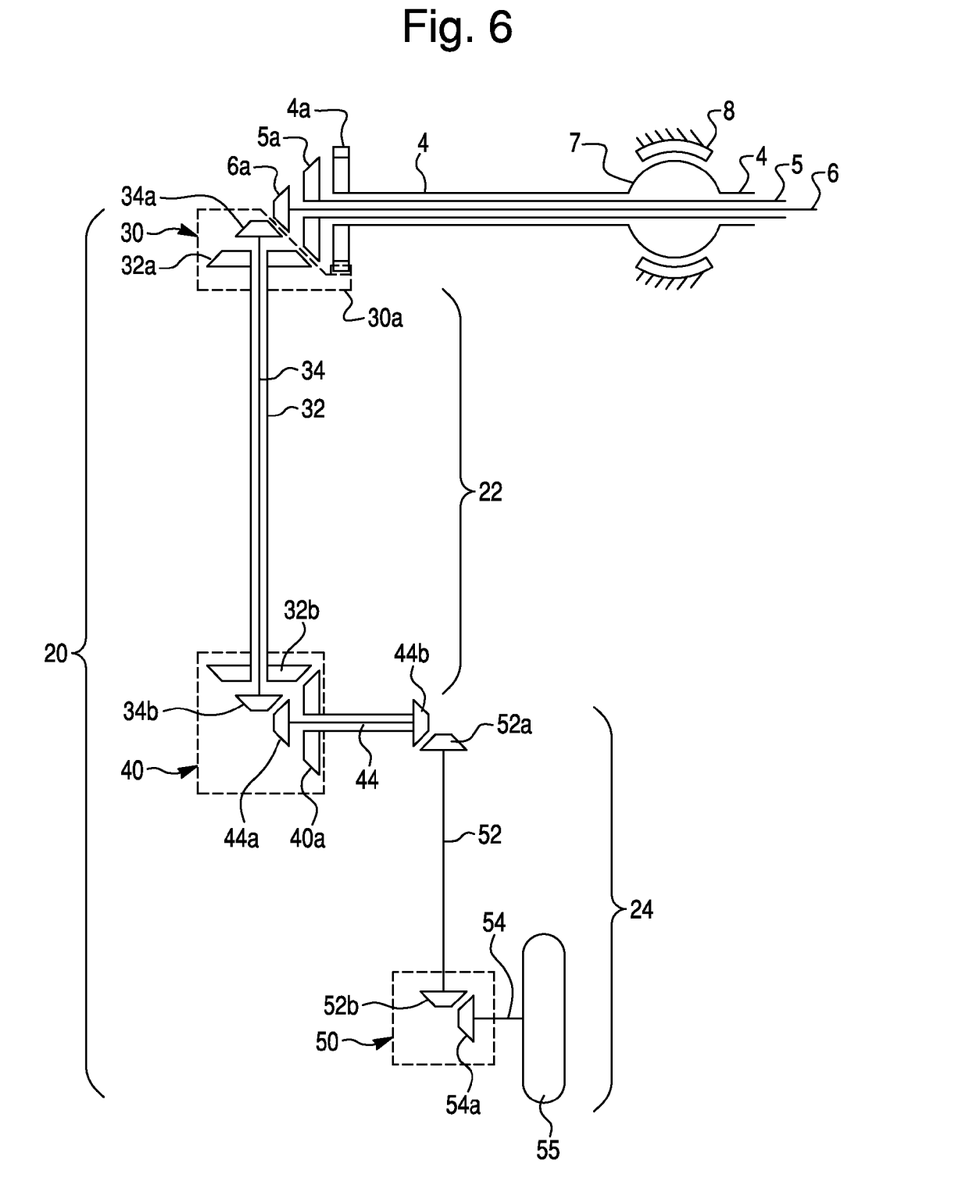
FIG. 6 is a schematic representation of an exemplary gear-and-shaft drive system driven and articulated by the ball-and-socket assembly of FIG. 4.
Figure 7:
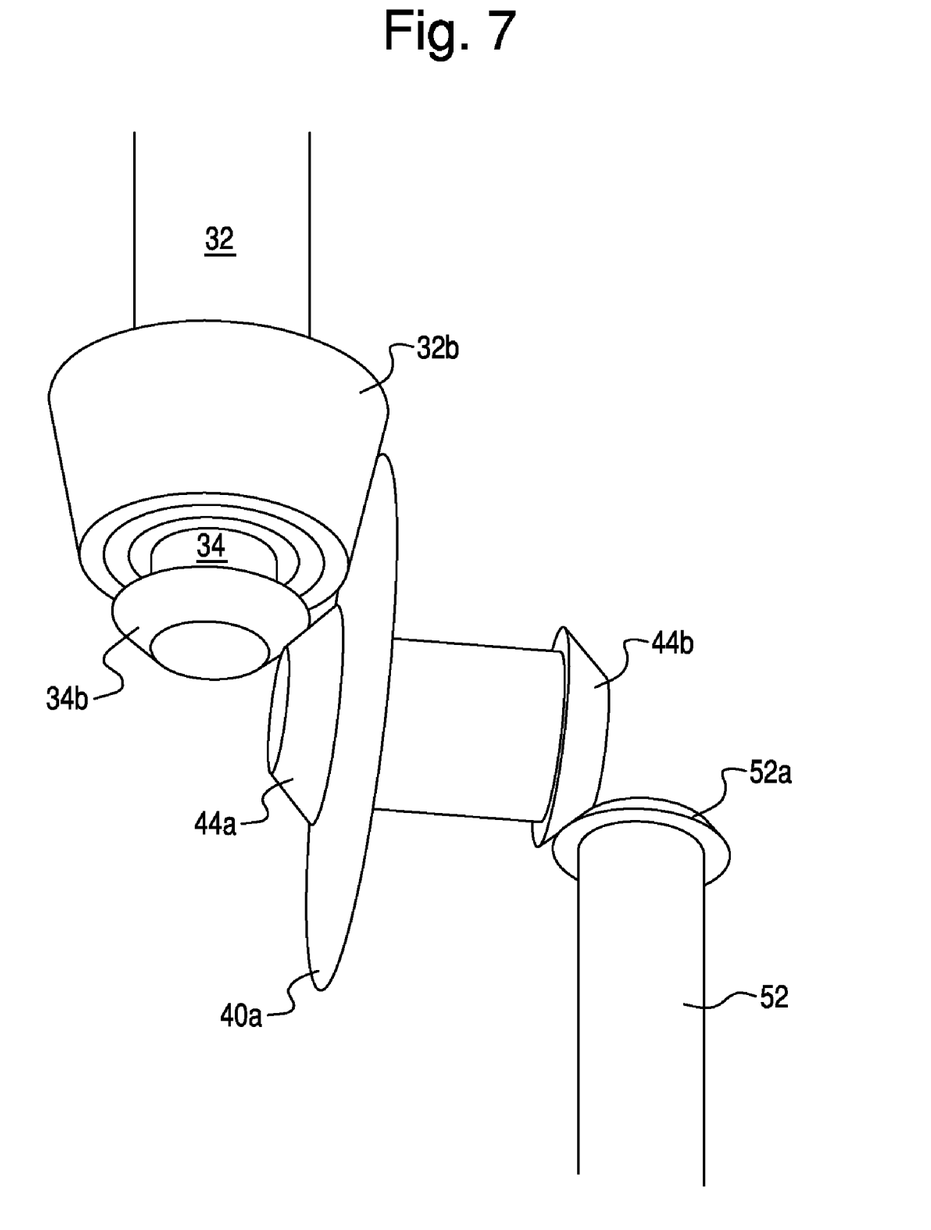
FIG. 7 is an enlarged fragmented view of the shaft drive system of FIG. 5 showing the knee joint components.

FIG. 5 illustrates the vehicle 100 comprising the actuatable ball-and-socket joint system of FIG. 4 cooperating with a gear-and-shaft drive system in each of legs 102. The gear-and-shaft drive system is shown schematically in FIG. 6. FIG. 6 provides only one example of the utility for the ball-and-socket assembly of this invention. Alternative systems may be driven by the ball-and-socket assembly of this invention, for example, a chain or belt drive system or a pinion gear system. See for example, FIGS. 9 and 10.

With reference to FIG. 6, the drive shafts 4, 5, 6 of FIG. 4 are shown schematically with the ball joint 7 and bearing 8. At the end of each drive shaft 4, 5, 6 are mounted respective drive gears or pinions 4a, 5a, 6a. The three drive shafts 4, 5, 6 drive the leg assembly 20 including of a hip portion or joint 30, a knee portion or joint 40, and a wheeled foot portion 50, respectively. The hip portion 30 and the knee portion 40 together define an upper section 22 of the leg assembly 20, and the knee portion 40 and wheeled foot portion 50 together define a lower section 24 of the leg assembly 20. The knee portion 40 provides a connection point for the upper and lower sections 22, 24.

Generally speaking, the leg assembly 20 and associated drive components of this illustrated embodiment are designed to function much like a human leg whereby the hip portion 30 may pivot forward and aft. Moreover, the knee portion 40 may pivot to articulate the foot portion 50 forward and aft. The wheeled foot portion 50 is designed to provide a rolling motion.

More specifically, the hip portion 30 may be driven by shaft 4 and drive pinion 4a, which engages gear 30a joined to the upper leg section. Rotation of the shaft 4 and drive pinion 4a causes the entire leg assembly 20 (upper and lower sections 22, 24) in a forward and reverse direction (i.e., in and out of the papers as shown in FIG. 2a). At the same time, the drive shafts 5, 6 are arranged to drive concentric upper leg shafts 32, 34, respectively, whereby drive pinions 5a, 6a engage pinions 32a, 34a near the hip portion 30.

The knee portion 40 is driven by shaft 32 and drive pinion 32b, which engages gear 40a, to pivot the lower section 24 of the leg assembly 20 in a forward and reverse direction (i.e., in and out of the papers as shown in FIG. 6).

The leg shaft 34 is arranged to drive lower leg shaft 52 through knee shaft 44. A drive pinion 34b at the end of leg shaft 34 engages pinion 44a and drives shaft 44. The opposite of shaft 44 includes a pinion 44b, which engages with a pinion 52a of lower leg shaft 52. The lower end of leg shaft 52 includes a pinion 52b which engages pinion 54a of axle 54. Torque is transmitted to the wheel 55 through pinion 44b, 52a and via the shaft 52 which in turn drives wheel shaft 54 via the pinions 52b and 54a.

The foregoing gear and shaft system illustrated by FIG. 6 is shown by way of example only and other means of transmission from the ball-and-socket drive assembly of FIG. 4 may be employed without departing from the spirit and scope of this invention. For example, the drive pinions 4a, 5a, 6a may drive the hip joint 30, knee joint 40 and wheeled foot 50 through a belt-drive system or other geared system.

Figure 9:
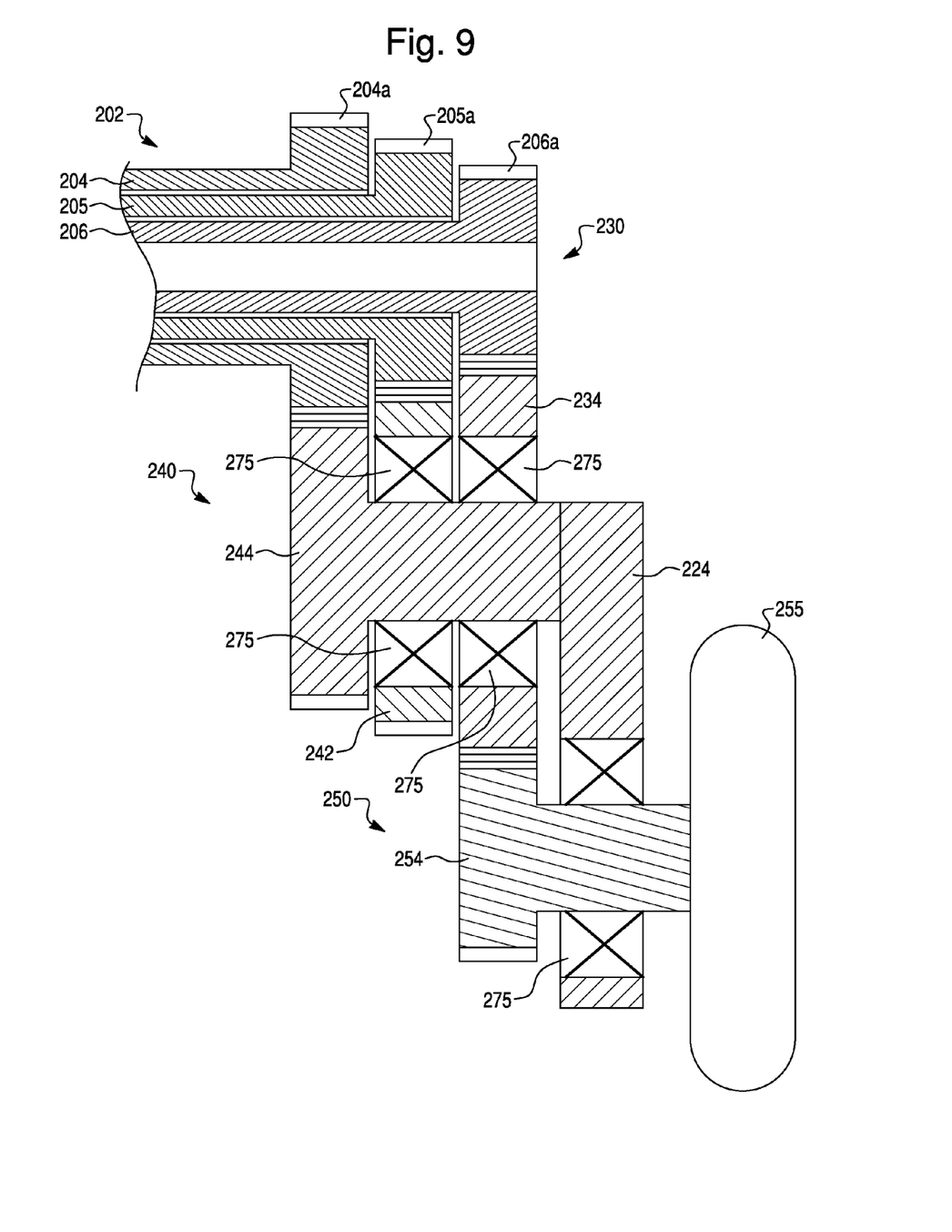
FIG. 9 illustrates an alternate embodiment of the vehicle embodying a gear drive system for the hip joint, knee joint and wheeled foot.

FIG. 9 illustrates, via cross-sectional side view, an alternate embodiment of the vehicle embodying a gear drive system for the hip joint, knee joint and wheeled foot. As with the embodiment of FIGS. 4-6, the geared drive system of FIG. 9 receives torque from the joint system of FIG. 4 through the spur or pinion gears 204a, 205a, 206a fitted, mounted or otherwise operatively connected to the drive shafts 204, 205, 206, respectively, which correspond to the drive shafts 4, 5, 6 of FIG. 4.

The first drive pinion 204a drives the knee portion 240 via toothed engagement of the pinion 204a with knee pinion 244. Rotational movement of first drive pinion 204a transmits rotational movement with meshed knee pinion 244, which is fixedly connected to a lower leg portion 224 so that leg portion 224 pivots about the axis of pinion 244. The lower leg portion 224 is in turn connected to wheeled foot 255 about bearing 275 for causing wheeled foot 255 to pivot in conjunction with the lower leg portion 224. In operation, rotation of the first drive pinion 204a rotates the knee pinion 244, which causes pivoting movement of the lower leg portion 224 and the wheeled foot 255 connected thereto.

A hip portion 230 includes a hip pinion 205a driven by the intermediate shaft 205 to pivot the entire leg 202 (including the knee portion 240, the lower leg portion 224, and the wheeled foot 255) about the hip portion 230, that is, about the common axis of drive shafts 204-206.

The wheeled foot section 250 is driven by a combination of pinions and shafts that are carried by the hip portion 230 and the knee portion 240. Specifically, as the inner drive shaft 206 is rotated by the motor, the pinion 206a mounted on inner drive shaft 206 is rotated. The inner drive shaft pinion 206a has teeth meshing with and drives an intermediate gear 234, which is mounted to rotate about the extended shaft section of the knee pinion 244. The teeth of the intermediate gear 234 also mesh with and transmit the driving motion to the wheel pinion 254. Wheel 255 is fixedly connected to the wheel pinion 254 to rotate in unison with the wheel pinion 254. In this manner, the walk and roll robot can achieve both rolling motion at the wheeled foot 255 and walking motion at the hip portion 230 and the knee portion 240.

It is noted that suitable thrust bearings 275 are preferably disposed between each of the gear members shown in FIG. 9 and the shaft to which they are mounted. Additional bearings may be added to the system as needed or desired.

The gear bearing system of FIG. 9 and similar systems may be utilized in the walk and roll robotic unit 100 to achieve various ranges of torque or speed without allowing the gears to backdrive. Suitable backlash prevention devices may also be employed depending on the type of leg drive system being used. The use of backlash prevention devices is useful and can improve energy efficiency because power does not have to be applied in order for the robot to maintain a stance. However, such backlash prevention devices can also have disadvantages. For example, if the robot impacts an object, the backlash prevention devices may prevent transfer of the energy in the joints. Because of this potential problem, compliance may be added to the gears to allow for small amounts of rotation upon impact.

Compliance can be added, for example, to the gear bearing by placing one of the gears on an inner race with thin dense chromium between the two surfaces for improving lubrication. Using a pin and two stops, the travel of the bearing may be limited and thus may be adjusted as needed for a particular application. A spring may be added around the two races to reduce rattling and provide a natural neutral stop such that the gearing will return to its original position once the external impact is absorbed.

The above embodiment can also be done utilizing a traditional bearing race rather than the thin dense chromium. This would be accomplished using a spring (e.g. torsion spring) pinned on the outer race at one end and on the inner race at the opposite end. As the angle of rotation increases, the spring would tend to pull the bearing races back toward center. The spring constant (k) would need to be small enough that the leg could still move freely with the motor, while providing a neutral stop.

Thus, the gears can be made to have limited compliance. The allowed backdrive can be altered by moving the mechanical hardstops on the pivot points of the leg.

One exemplary system for transferring motion from the motors to the individual joints is to utilize the shaft drive architecture illustrated in FIGS. 4 to 6, which utilizes concentric shafts extending from the hip. The embodiment illustrated in FIGS. 4 to 6 provides a compact system and permits for efficient driving of the hip, knee, and wheel joints. Although another embodiment of this invention utilizes gears, the need for the center gear causes some extra loss of energy through friction and limits the length of the leg. Furthermore, the shaft drive architecture of FIGS. 4 to 6 allows for the addition of linear suspension.

Figure 8:
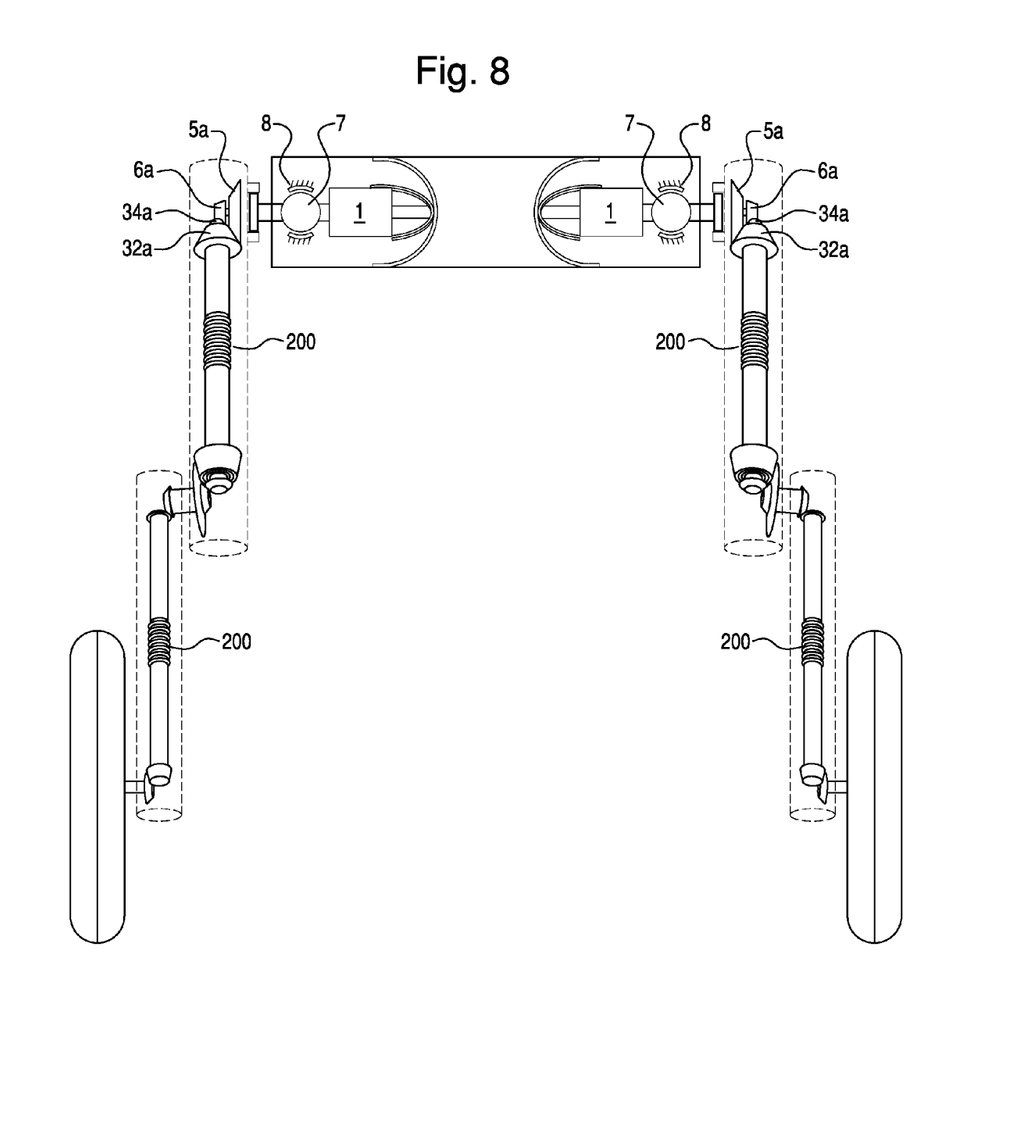
FIG. 8 illustrates in transparent view a linear suspension concept of the invention as applied to the shaft drive system of FIG. 5.

FIG. 8 illustrates one example of a suspension system envisioned by this invention, in which the rotational energy from the motor can be transferred down the leg using a shaft drive architecture as described above. Conventional spring/damper systems 200 can then be added along the shaft for compliance and shock absorption. Using sensory equipment such as visual systems, the operator can anticipate physical impacts to the robot, such as radical changes in the terrain, e.g., sudden drops or ledges. The robot can plan these impacts against the ground or an obstacle to actively drive the legs in order to absorb shock.

In an alternative embodiment the robot may employ a belt or chain drive system. One particular advantage of a belt or chain drive system is that the leg may be made of various non-rigid materials with limited compliance, thereby allowing the legs themselves can become a suspension system. For example, energy can be transferred down the leg utilizing belts with limited elasticity. Shock impact from the terrain or obstacles can be absorbed by the belt, more specifically by allowing the belt to stretch. This can be done using either slipping of the belts when impact occurs or by utilizing a chain mechanism which will not slip but will stretch slightly and allow the gears to rotate to absorb the shock and then return them to their original position.

The exemplary robot embodied herein may use rolling motion to traverse smooth surfaces. Unlike many conventional robots, the exemplary robot embodied herein can also employ walking motion to accomplish steering, shock absorption, parallel parking, jumping (bouncing), climbing, and traversal of uneven terrain. Steering may be accomplished, for example, by selectively adjusting individual wheel speed (differential turning speeds), individual wheel base position (differential turning radius) and individual wheel height position (lean and balance). Shock absorption will be accomplished by allowing each leg to individually comply with road shock. The robot's use of gear bearings allow for customizable gear ratios per application, ranging for example from 1:5 to 1:3000. One example of gear bearing adaptable for use with embodiments of the present invention is shown and described in U.S. Pat. No. 6,626,792 which is hereby incorporated by reference.

The walk and roll motion will provide cross country capabilities superior to that of tracked vehicles, by stepping or climbing over obstacles it cannot roll over. If rolling motion is impeded or made impossible due to the terrain or some other reason, the robot may employ its walking capabilities to traverse terrain and allow the robot to escape from potential dead spots. Tracked vehicles cannot match these capabilities in terms of power, speed efficiency, and versatility. Tracked vehicles and their supporting infrastructure are heavy, frictional and inefficient and as a result, they suffer in speed performance and have problems in durability and reliability, a necessity for exploration on other planets and locations where immediate repair may not be possible.

Walk and roll motion can be enacted as a viable alternative to tracked vehicles because modern magnetic materials, gear bearing mechanical drives and computer controlled intelligent control can allow a wheeled vehicle to walk, climb and roll in an effective coordinated manner, thereby creating a light, compact, and cost-effective package. The robot/vehicle embodied herein has practical, commercial, and other potential applications in a variety of fields including industry, space and planetary exploration, automobile design, medicinal uses, household items, and toys.

An important feature of the walk and roll robot is that the majority of the mass of the robot is contained within the chassis and therefore the center of mass can easily be shifted as needed for various movements. The height of the center of mass can be adjusted independently of the wheel motion in order to increase stability while traversing obstacles. By allowing the center of mass to change, the robot can also lean into a turn, providing greater stability when turning at higher speeds. Furthermore, the body pitch can be maintained in order to maintain a stable base for carrying payload.

In exemplary embodiments all mechanical and electrical parts are contained within the robot, allowing the parts to be easily shielded from outside environmental effects such as dust or moisture. In locations such as the moon or other planets where dust is the usual culprit in mechanical or electrical failures, such an issue will not plague the exemplary robot embodied herein because all parts may be protected. In addition, having all the mechanical and electrical parts concentrated in one place allows for a heavy enclosure, if needed, to cover the main body. This feature can be particularly helpful in volatile environments in which a completely sealed design is necessary to prevent unintentional and harmful interaction with the environment.

This robot has unique capabilities in terms of motion due to the kinematics and degrees of freedom. In its current configuration, the robot can perform motions such as rolling, walking, jumping, and balancing.

The walk and roll robot of the illustrated exemplary embodiment has knee and hip joints which can be moved to any position while still maintaining the ability to roll since the joints can be actuated independently. The robot may provide various rolling stances utilized for various circumstances. For example, the "spider stance" is provided when the knee joint is above the body and the wheels are outside the body. This provides a wide stance which increases stability. The center of mass is also shifted down because the body is held lower and the mass is concentrated in the body, which is desirable when the robot is going up an inclined surface.

Stepping is more efficient and fluid in the walk and roll robot than other robots because of the multiple (e.g., five) degrees of freedom as well as the ability for wheels, legs, and hips to rotate 360 degrees both forwards and backwards. Additionally, the increased flexibility allows the robot to step over obstacles which would be too large for other walking robots. The stepping algorithm for this robot may use a quartic spline, which defines the initial wheel position and velocity. It may also define the position of the highest obstacle within the planned step. By calculating a trajectory using these parameters for the wheel, the program can then utilize inverse kinematics in conjunction with an energy efficiency metric to create trajectories for each joint which will be the most energy efficient trajectory. At each time step, the robot can check for obstacles and adjust its path as necessary to avoid them.

By determining the center of mass of the robot and maintaining a stance which keeps the center of mass within the support triangle of three wheels on the ground, the robot can remain balanced, even during complex maneuvers with a fourth leg. This allows the robot to perform motions such as stepping over obstacles, side stepping, or reaching out without falling over. Because of the multiple degrees of freedom and ability to move the center of mass even while maintaining certain conditions such as holding the wheels in place or keeping the body static, the design of the illustrated exemplary embodiment is an improvement over conventional balancing robots.

In a mobile robot, passive suspension is necessary to deal with unexpected bumpy terrain and for physical compliance. By adding multiple means of suspension, both active and passive, the robot becomes more robust and well suited for rugged applications.

In exemplary embodiments, the walk and roll robot can articulate its legs, e.g., to simulate walking or for balancing or turning purposes, while simultaneously rolling on its wheels to improve or attain maximum efficiency. For instance, in a scenario in which the robot is rolling over slightly bumpy terrain, the robot control its leg joints to maintain the main body of the robot relatively steady and horizontal, even for inclining or declining surfaces. Furthermore, the compactness of the robot allows for electronics and other systems and equipment to be stored in the main body of the robot, protected from environmental forces. Also, in embodiments in which the gearing does not permit back-driving, no holding torque is required to hold a joint in a certain position. Most robots utilize conventional motors and gearings which require power to hold the joint at most positions. Thus, the walk-and-roll robot of this invention may be embodied to possess higher power efficiency than conventional system.

The walk-and-roll robot designs described herein can provide various combinations of desirable features, including passive compliance in the leg gearing system and gear bearings, an actuatable ball-and-socket joint with significant range of motion, and a shaft or gear drive for transferring power from the motor to the legs and wheels in an efficient and compact manner. Advantageously, all of these design features are highly scalable to allow for the development of large and small robots alike.

In exemplary embodiments the walk-and-roll robot described herein may utilize a directed flux motor and an optional epicyclical gear bearings to articulate the legs and wheels. These design choices allow for a compact configuration and prevents gear backdrive. This compact design where all of the components are contained within the body allows the robot to be utilized for multiple applications including those with harsh environments where robots traditionally have difficulty with debris, moisture, or dust. Because the components are all contained within the body, there is only one opening for each leg which may be shielded from outside debris. The gearing and articulation allow for a wide range of motions besides walking and rolling including side stepping, active shock absorption, and jumping.

Many of the embodiments of the invention provide improvements for the previous walk and roll robots which improve kinematics, compliance, and actuation. In certain embodiments these improvements allow for greater joint motion in the hip joint as well as a more compact and energy efficient configuration. Various compliances and alternative means of leg jointing described herein create flexibility towards designing the robot for a particular application.

While the invention has been shown and described with reference to several exemplary embodiments, it will be understood by those of skill in the art that various changes in form and detail may be made to the disclosed invention without departing from the spirit and scope of the invention as set forth in the attached claims.

What is claimed is:

1. A mobile robotic unit, the mobile robotic unit comprising:
   a main body;
   a plurality of legs for supporting the main body on and moving the main body in forward and reverse directions about a base surface, each leg including a respective pivotal hip joint, a pivotal knee joint, and a wheeled foot adapted to roll along the base surface;
   a drive assembly comprising
      a motor operatively associated with the hip and knee joints and the wheeled foot for independently driving pivotal movement of the hip joint and the knee joint and rolling motion of the wheeled foot, and
      a plurality of swivel shafts; and
   a swivel assembly engaging the plurality of swivel shafts and comprising a fixable element securable relative to the main body, the swivel assembly adapted to cooperate with the swivel shafts to pivot the drive assembly with at least two degrees of freedom relative to the main body, wherein the swivel shafts comprise pinions and the swivel assembly comprises racks which cooperate with the pinions.

2. The mobile robotic unit according to claim 1, wherein the hip joint and the pivotal knee joint are simultaneously yet independently drivable by the motor to create forward and reverse walking motions.

3. The mobile robotic unit according to claim 1, wherein the drive assembly further comprises a plurality of drive shafts for imparting driving pivotal movement to the hip joint, pivotal movement the knee joint, and rolling motion to the wheeled foot, respectively.

4. The mobile robotic unit according to claim 3, wherein at least one of the drive shafts is configured to form a ball member of a ball-and-socket joint about which the leg may move relative to the main body with at least two degrees of freedom of movement.

5. The mobile robotic unit according to claim 3, wherein the drive shafts are concentrically arranged relative to one another.

6. The mobile robotic unit according to claim 1, further comprising a geared drive system for permitting the motor to drive the pivoting movement of the knee joint and the rolling motion of the wheeled foot.

7. The mobile robotic unit according to claim 1, wherein the swivel shafts are concentrically arranged relative to one another.

8. A mobile robotic unit, comprising:
a main body;
a plurality of legs for supporting the main body on and moving the main body in forward and reverse directions about a base surface, each leg including a respective pivotal hip joint, a pivotal knee joint, and a wheeled foot adapted to roll along the base surface;
a drive assembly comprising a motor operatively associated with swivel shafts for pivoting the leg with at least two degrees of freedom relative to the main body to permit swiveling movement of the leg; and
a swivel assembly secured to the main body, the swivel assembly adapted to cooperate with the swivel shafts to pivot the leg with at least two degrees of freedom relative to the main body, wherein the swivel shafts comprise pinions and the swivel assembly comprises racks which cooperate with the pinions.

9. The mobile robotic unit according to claim 8, wherein the swivel shafts are concentrically arranged relative to one another.

10. The mobile robotic unit according to claim 8, wherein the drive assembly further comprises a plurality of drive shafts extending from the motor in an opposite direction relative to the swivel shafts.

11. The mobile robotic unit according to claim 10, wherein at least one of the drive shafts is configured to form a ball member of a ball-and-socket joint about which the leg may move relative to the main body with at least two degrees of freedom of movement.

12. The mobile robotic unit according to claim 8, wherein the swivel shafts are concentrically arranged relative to one another.

13. The mobile robotic unit according to claim 10, wherein at least one of the drive shafts is configured to form a ball member of a ball-and-socket joint about which the leg may move relative to the main body with at least two degrees of freedom of movement.

14. A mobile robotic unit, the mobile robotic unit comprising:
a main body;
a plurality of legs for supporting the main body on and moving the main body in forward and reverse directions about a base surface, each leg including a respective pivotal hip joint, a pivotal knee joint, and a wheeled foot adapted to roll along the base surface;
a swivel assembly engaging the plurality of swivel shafts and secured to the main body; and
a drive assembly comprising a motor, a plurality of drive shafts, and a plurality of swivel shafts adapted to cooperate with the swivel assembly;
said motor being operatively associated with the drive shafts for independently driving pivotal movement of the hip joint and the knee joint with first and second degrees of freedom and rolling motion of the wheeled foot with a third degree of freedom; and
said motor being operatively associated with the swivel shafts to pivot the leg with fourth and fifth degrees of freedom to permit swiveling movement of the leg.

15. The mobile robotic unit according to claim 14, wherein the swivel shafts are concentrically arranged relative to one another.

16. The mobile robotic unit according to claim 14, wherein the drive shafts are concentrically arranged relative to one another.

17. The mobile robotic unit according to claim 14, wherein:
the swivel shafts are concentrically arranged relative to one another; and
the drive shafts are concentrically arranged relative to one another and diametrically oppose the swivel shafts on opposite sides of the motor.

18. The mobile robotic unit according to claim 14, wherein the swivel shafts comprise pinions and the swivel assembly comprises racks which cooperate with the pinions.

19. The mobile robotic unit according to claim 14, wherein at least one of the drive shafts is configured to form a ball member of a ball-and-socket joint about which the leg may move relative to the main body with at least two degrees of freedom of movement.

20. A mobile robotic unit, comprising:
a main body;
a plurality of legs for supporting the main body on and moving the main body in forward and reverse directions about a base surface, each leg including a respective pivotal hip joint, a pivotal knee joint, and a wheeled foot adapted to roll along the base surface; and
a drive assembly comprising a motor operatively associated with swivel shafts for pivoting the leg with at least two degrees of freedom relative to the main body to permit swiveling movement of the leg, wherein the drive assembly further comprises a plurality of drive shafts extending from the motor in an opposite direction relative to the swivel.

* * * * *